US012791871B2

(12) United States Patent
Sharma et al.

(10) Patent No.: US 12,791,871 B2
(45) Date of Patent: Nov. 10, 2026

(54) ADAPTIVE DISPLAY CONFIGURATION FOR AUTONOMOUS VEHICLE

(71) Applicant: GM Global Technology Operations LLC, Detroit, MI (US)

(72) Inventors: Manoj Kumar Sharma, Troy, MI (US); Joseph F. Szczerba, Grand Blanc, MI (US); Tzvi Philipp, Bet Shemesh (IL); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 370 days.

(21) Appl. No.: 18/416,257

(22) Filed: Jan. 18, 2024

(65) Prior Publication Data

US 2025/0237886 A1 Jul. 24, 2025

(51) Int. Cl.
*G02B 30/56* (2020.01)
*B60K 35/22* (2024.01)
(Continued)

(52) U.S. Cl.
CPC .............. *G02B 30/56* (2020.01); *B60K 35/22* (2024.01); *B60K 35/23* (2024.01); *B60K 35/40* (2024.01);
(Continued)

(58) Field of Classification Search
CPC ................ G02B 30/56; G02B 27/0093; G02B 2027/0134; G02B 2027/0187;
(Continued)

(56) References Cited

U.S. PATENT DOCUMENTS 10,324,351 B2 6/2019 Kim et al.
2003/0071216 A1 * 4/2003 Rabolt ...................... G01J 3/02
250/339.02

(Continued)

FOREIGN PATENT DOCUMENTS

DE 112015001685 T5 12/2016

OTHER PUBLICATIONS

Luo et al. CN 117196962; Display Method, Device, Equipment And Storage Medium (Year: 2023).*

*Primary Examiner* — Bumsuk Won
*Assistant Examiner* — Rahman Abdur
(74) *Attorney, Agent, or Firm* — Vivacqua Crane, PLLC

(57) ABSTRACT

A system for generating a floating image for a passenger within a vehicle includes a passenger monitoring system adapted to monitor the position of the passenger's head and eyes, a compute engine adapted to calculate a holographic image and encode the holographic image to a display of a picture generating unit (PGU) hologram generator, and a display screen positioned for viewing by the passenger and adapted to selectively switch between a first mode, wherein the display screen is adapted to display images for viewing by the passenger, and a second mode, wherein the display screen is adapted to function as a beam steering device, wherein, when the display screen is operating in the second mode, the display is adapted to project the holographic image to the display screen and the display screen re-directs the projected holographic image to the eyes of the passenger.

9 Claims, 4 Drawing Sheets

(51) Int. Cl.

| | |
|---|---|
| ***B60K 35/23*** | (2024.01) |
| ***B60K 35/40*** | (2024.01) |
| ***G03H 1/00*** | (2006.01) |
| ***G03H 1/22*** | (2006.01) |

(52) U.S. Cl.
CPC ......... *G03H 1/0005* (2013.01); *G03H 1/2294* (2013.01); *B60K 2360/29* (2024.01); *G03H 2226/02* (2013.01)

(58) Field of Classification Search
CPC ........... G02B 27/0103; G02B 26/0816; G02B 30/30; B60K 35/22; B60K 35/23; B60K 35/40; B60K 2360/29; B60K 35/211; B60K 35/215; B60K 35/28; B60K 35/654; B60K 35/656; G03H 1/0005; G03H 1/2294; G03H 2226/02; G06T 9/00; G06T 17/00; G03B 35/18; G09F 9/30
USPC ........................................................... 359/33
See application file for complete search history.

(56) References Cited

U.S. PATENT DOCUMENTS

2003/0071780 A1* 4/2003 Vincent .................. B82Y 20/00
345/107
2021/0070176 A1* 3/2021 Rao .......................... G09G 3/36

* cited by examiner

ADAPTIVE DISPLAY CONFIGURATION FOR AUTONOMOUS VEHICLE

INTRODUCTION

The present disclosure relates to a system for generating a floating image viewable by a passenger within a vehicle.

Current entertainment systems within vehicles generally comprise a screen or monitor that is mounted within the vehicle for viewing by the passengers. Some systems include smaller individual screens, wherein each passenger has a screen for their personal viewing. Known systems incorporate inverse head-up-display architectures that use beams splitters that must be attached to structure within the vehicle compartment and must be constantly re-adjusted to accommodate height and position variations of the passenger within the vehicle compartment.

While current systems achieve their intended purpose, there is a need for a new and improved system for providing a floating three-dimensional image that appears centrally located within an autonomous vehicle to the passenger within the vehicle.

SUMMARY

According to several aspects of the present disclosure, a system for generating a floating image for a passenger within a vehicle includes a passenger monitoring system adapted to monitor the position of the passenger's head and eyes, a compute engine in communication with the passenger monitoring system and adapted to calculate a holographic image and encode the holographic image to a display of a picture generating unit (PGU) hologram generator, and a display screen positioned for viewing by the passenger, the display screen adapted to selectively switch between a first mode, wherein the display screen is adapted to display images for viewing by the passenger, and a second mode, wherein the display screen is adapted to function as a beam steering device, wherein, when the display screen is operating in the second mode, the display is adapted to project the holographic image to the display screen and the display screen is adapted to re-direct the projected holographic image to the eyes of the passenger, based on the information received from the passenger monitoring system.

According to another aspect, the compute engine is further adapted to encode a lens function into the holographic image based on information received from the passenger monitoring system.

According to another aspect, the display screen includes a selectively reversible electromagnetic coating, wherein, when the display screen is operating in the first mode, the reversible electromagnetic coating is substantially transparent, and when the display screen is operating in a second mode, the reversible electromagnetic coating is reflective.

According to another aspect, the compute engine is further adapted to calculate and encode an adjustable diffraction grating into the holographic image, wherein the diffraction grating is adapted to selectively adjust the angle of the projected holographic image from the display based on feedback from the passenger monitoring system.

According to another aspect, the holographic image comprises a single two-dimensional holographic image, and the display screen, when operating in the second mode, is adapted to re-direct the single two-dimensional holographic image directly to both a right eye of the passenger and a left eye of the passenger simultaneously, wherein the passenger perceives the two-dimensional holographic image floating within the vehicle in front of the passenger.

According to another aspect, the holographic image comprises a single two-dimensional holographic image, and the diffraction grating is adapted to alternately adjust the angle of the projected holographic image, wherein the display screen, when operating in the second mode, is adapted to alternately re-direct the single two-dimensional holographic image directly to only a right eye of the passenger and then only to a left eye of the passenger, switching back and forth between the right eye and the left eye at a frequency greater than 30 Hz, wherein the passenger perceives the two-dimensional holographic image floating within the vehicle in front of the passenger.

According to another aspect, the holographic image includes a right-eye image and a left-eye image, the compute engine is adapted to calculate the right-eye image and the left-eye image and to alternately encode the right-eye image to the display and encode the left-eye image to the display, switching back and forth between encoding the right-eye image and encoding the left-eye image at a frequency greater than 30 Hz, the display adapted to project, alternately, at a frequency greater than 30 Hz and in sync with the compute engine, the right-eye image and the left-eye image, through the diffraction grating, to the display screen, and the compute engine is adapted to, alternately, at a frequency greater than 30 Hz and in sync with the display, encode the diffraction grating within the projected right-eye image to adjust the angle of the projected right-eye image such that the display screen, when in the second mode, re-directs the right-eye image directly to the right eye of the passenger and, encode the diffraction grating within the projected right-eye image to adjust the angle of the projected left-eye image such that the display screen, when in the second mode, re-directs the left-eye image directly to the left eye of the passenger, wherein the right-eye image and the left-eye image are slightly different perspectives of a single image such that when the right eye of the passenger receives the right-eye image and the left eye of the passenger receives the left-eye image, the passenger perceives a three-dimensional image floating within the vehicle in front of the passenger.

According to another aspect, the holographic image includes a right-eye image and a left-eye image, the display comprises a right-eye display and a left-eye display, the compute engine is adapted to calculate the right-eye image and a first adjustable diffraction grating, the left-eye image and a second adjustable diffraction grating, and to simultaneously encode the first diffraction grating into the right-eye image and encode the right-eye image to the right-eye display and encode the second diffraction grating into the left-eye image and encode the left-eye image to the left-eye display, the right-eye display and the left-eye display are adapted to project, simultaneously, the right-eye image to the display screen and the left-eye image to the display screen, and wherein, the first diffraction grating is adapted to adjust the angle of the projected right-eye image from the right-eye display based on feedback from the passenger monitoring system, such that the display screen, when in the second mode, re-directs the right-eye image directly to the right eye of the passenger, and, simultaneously, the second diffraction grating is adapted to adjust the angle of the projected left-eye image from the left-eye display based on feedback from the passenger monitoring system, such that the display screen, when in the second mode, re-directs the left-eye image directly to the left eye of the passenger, wherein the right-eye image and the left-eye image are slightly different perspectives of a single image such that when the right eye of the passenger receives the right-eye image and the left eye of the passenger receives the left-eye image, the passenger perceives a three-dimensional image floating within the vehicle in front of the passenger.

According to another aspect, the display screen is mounted within the vehicle adjacent to or above passenger seating that is opposite the passenger.

According to several aspects of the present disclosure, a method of generating a floating image for a passenger within a vehicle includes monitoring, with a passenger monitoring system, the position of the passenger's head and eyes, calculating, with a compute engine in communication with the passenger monitoring system, a holographic image, encoding, with the compute engine, a lens function into the holographic image based on information received from the passenger monitoring system, encoding the holographic image to a display of a picture generating unit (PGU) hologram generator, projecting, with the display, the holographic image to a display screen that is positioned for viewing by the passenger and adapted to selectively switch between a first mode, wherein the display screen is adapted to display images for viewing by the passenger, and a second mode, wherein the display screen is adapted to function as a beam steering device, and when the display screen is operating in the second mode, re-directing, with the display screen, the projected holographic image to the eyes of the passenger, based on the information received from the passenger monitoring system.

According to another aspect, the display screen includes a selectively reversible electromagnetic coating, wherein, when the display screen is operating in the first mode, the reversible electromagnetic coating is substantially transparent, and when the display screen is operating in a second mode, the reversible electromagnetic coating is reflective, the method further including actuating the selectively reversible electromagnetic coating to cause the display screen to operate in the second mode.

According to another aspect, the projecting, with the display, the holographic image to the display screen that is positioned for viewing by the passenger, further includes encoding, with the compute engine, an adjustable diffraction grating into the holographic image and adjusting, with the adjustable diffraction grating, the angle of the projected holographic image from the display based on feedback from the passenger monitoring system.

According to another aspect, the calculating, with the compute engine, the holographic image further includes, calculating, with the compute engine, a single two-dimensional holographic image, and the re-directing, with the display screen, the projected holographic image to the eyes of the passenger further includes, re-directing, with the display screen, the single two-dimensional holographic image directly to both a right eye of the passenger and a left eye of the passenger simultaneously, wherein the passenger perceives the two-dimensional holographic image floating within the vehicle in front of the passenger.

According to another aspect, the calculating, with the compute engine, the holographic image further includes, calculating, with the compute engine, a single two-dimensional holographic image, the adjusting, with the adjustable diffraction grating, the angle of the projected holographic image from the display based on feedback from the passenger monitoring system further includes alternately adjusting, with the adjustable diffraction grating, the angle of the projected holographic image from the display based on feedback from the passenger monitoring system, and the re-directing, with the display screen, the projected holographic image to the eyes of the passenger further includes, alternately re-directing, with the display screen, the single two-dimensional holographic image directly to only a right eye of the passenger and then only to a left eye of the passenger, switching back and forth between the right eye and the left eye at a frequency greater than 30 Hz, wherein the passenger perceives the two-dimensional holographic image floating within the vehicle in front of the passenger.

According to another aspect, the holographic image includes a right-eye image and a left-eye image, and the calculating, with the compute engine, the holographic image further includes, calculating, with the compute engine, the right-eye image and the left-eye image, the encoding the holographic image to the display of the picture generating unit (PGU) hologram generator further includes alternately encoding, with the compute engine, the right-eye image to the display and encoding, with the compute engine, the left-eye image onto the display, and switching back and forth between encoding the right-eye image and encoding the left-eye image at a frequency greater than 30 Hz, the projecting, with the display, the holographic image to the display screen further includes projecting, alternately, at a frequency greater than 30 Hz and in sync with the compute engine, the right-eye image and the left-eye image through the diffraction grating to the display screen, and the re-directing, with the display screen, the projected holographic image to the eyes of the passenger further includes alternately, at a frequency greater than 30 Hz and in sync with the compute engine and the display, adjusting, with the diffraction grating, the angle of the projected right-eye image and re-directing, with the display screen in the second mode, the right-eye image directly to the right eye of the passenger and adjusting, with the diffraction grating, the angle of the projected left-eye image and re-directing, with the display screen in the second mode, the left-eye image directly to the left eye of the passenger, wherein the right-eye image and the left-eye image are slightly different perspectives of a single image such that when the right eye of the passenger receives the right-eye image and the left eye of the passenger receives the left-eye image, the passenger perceives a three-dimensional image floating within the vehicle in front of the passenger.

According to another aspect, the holographic image includes a right-eye image and a left-eye image, the display includes a right-eye display and a left-eye display, and the PGU includes a first adjustable diffraction grating positioned in front of the right-eye display and a second adjustable diffraction grating positioned in front of the left-eye display, wherein, the calculating, with the compute engine, the holographic image further includes calculating, with the compute engine, the right-eye image and a first diffraction grating and encoding the first diffraction grating into the right-eye image, and calculating, with the compute engine, the left-eye image and a second diffraction grating and encoding the second diffraction grating into the left-eye image, the encoding the holographic image to the display of the picture generating unit (PGU) hologram generator further includes simultaneously encoding, with the compute engine, the right-eye image onto the right-eye display and encoding, with the compute engine, the left-eye image onto the left-eye display, the projecting, with the display, the holographic image to the display screen further includes simultaneously projecting, with the right-eye display and the left-eye display, the right-eye image to the display screen and the left-eye image to the display screen, and the re-directing, with the display screen, the projected holographic image to the eyes of the passenger further includes simultaneously adjusting the angle of the projected right-eye image from the right-eye display with the first diffraction grating encoded therein based on feedback from the passenger monitoring system, adjusting the angle of the projected left-eye image from the left-eye display with the second diffraction grating encoded therein based on feedback from the passenger monitoring system, re-directing, with the display screen, the right-eye image directly to the right eye of the passenger, and re-directing, with the display screen, the left-eye image directly to the left eye of the passenger, wherein the right-eye image and the left-eye image are slightly different perspectives of a single image such that when the right eye of the passenger receives the right-eye image and the left eye of the passenger receives the left-eye image, the passenger perceives a three-dimensional image floating within the vehicle in front of the passenger.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
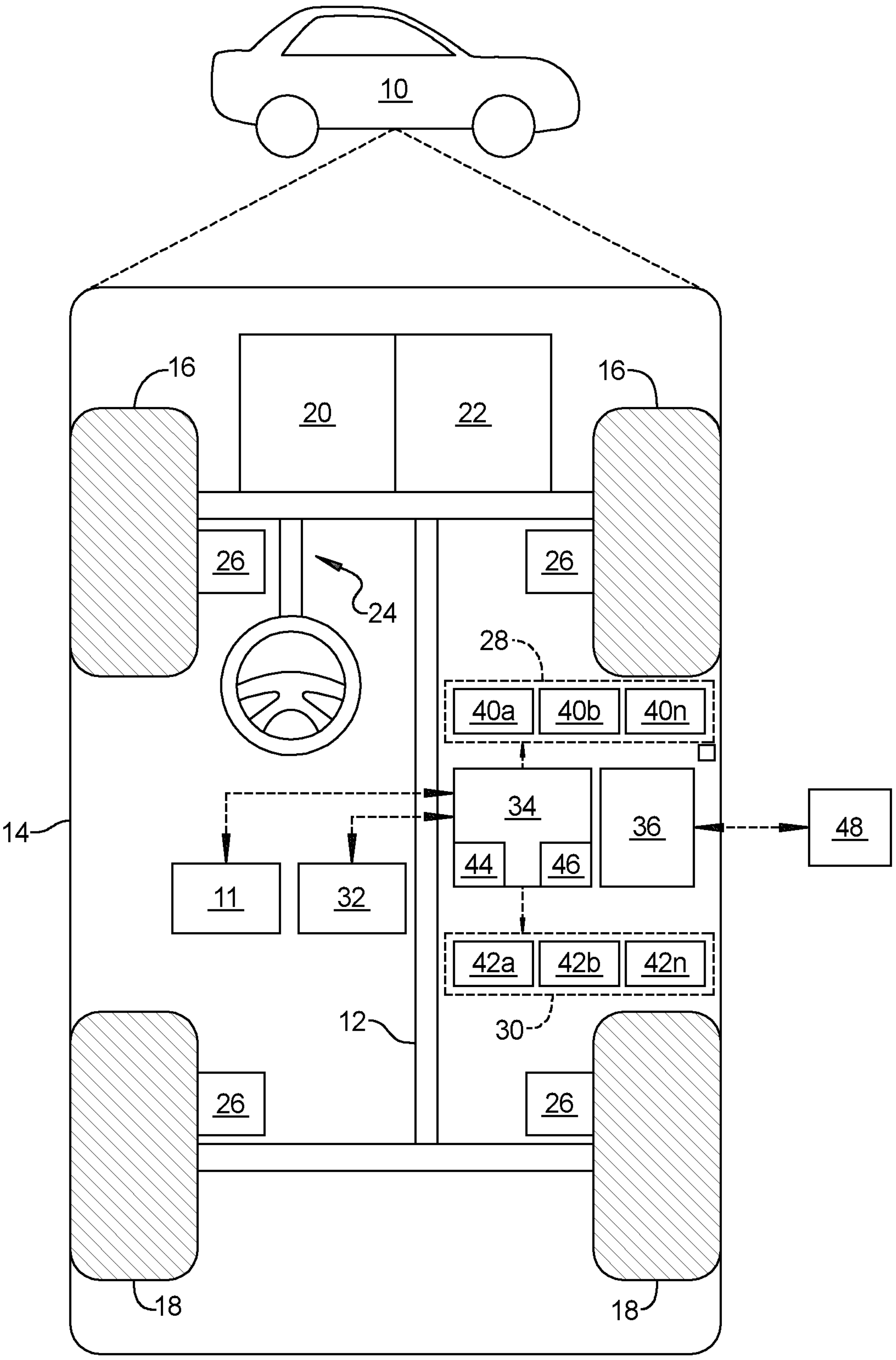
FIG. 1 is a schematic diagram of a vehicle according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for generating a floating image for a passenger within the vehicle 10 in accordance with various embodiments. In general, the system 11 for generating a floating image for the passenger within the vehicle 10 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, a controller 34, and a communication system 36. In an embodiment in which the autonomous vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40*a*-40*n* that sense observable conditions of the exterior environment and/or the interior environment of the autonomous vehicle 10. The sensing devices 40*a*-40*n* can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The sensing devices 40*a*-40*n* can include sensors that monitor dynamic variables of the vehicle, such as its velocity, its acceleration, a number of times that the brake is applied, etc. The actuator system 30 includes one or more actuator devices 42*a*-42*n* that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
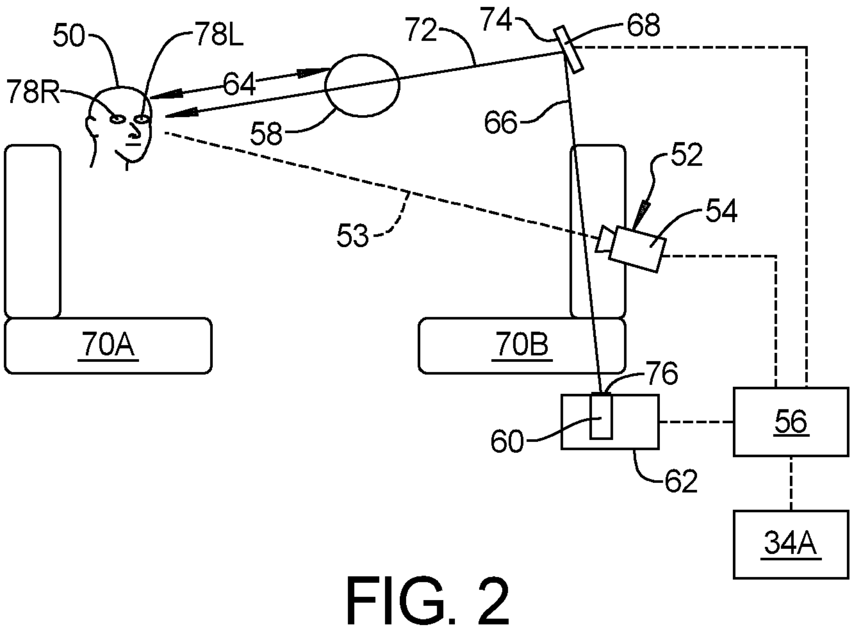
FIG. 2 is a schematic view of two seats within a vehicle incorporating a system according to an exemplary embodiment.

Referring to FIG. 2, the system 11 for generating a floating image for the passenger 50 within the vehicle 10 includes a passenger monitoring system 52 which includes a camera 54 that is adapted to monitor the position of the passenger's 50 head and eyes. A passenger monitoring system 52, often referred to as a driver monitoring system or DMS, is an artificial intelligence (AI)-based vehicle safety technology that monitors the passenger's 50 attentiveness through the camera 54. Purposes of the passenger monitoring system 52 is to identify the passenger and detect levels of vigilance through software and provide alerts in cases of drowsiness, distractions, etc. to avert accidents. The main features of DMS are driver ID, distraction detection, drowsiness detection, specific activity detection, eyeblink detection, emotion recognition and eyeball tracking. Used within the system 11 of the present disclosure, the primary purpose of the driver monitoring system 52 is to monitor the location of the eyes and head of the passenger 50 and the direction of the gaze of the passenger 50.

The system 11 further includes a compute engine 56 in communication with a system controller 34A and the passenger monitoring system 52. The system controller 34A may be the vehicle controller 34 or may be a separate controller in communication with the vehicle controller and adapted to support communication between the system 11 and other systems within the vehicle 10 and to receive data from sensors 40*a*-40*n* within the vehicle 10. The compute engine is adapted to calculate a holographic image 58 (phase hologram) and encode the holographic image 58 to a display 60 of a picture generating unit (PGU) hologram generator 62. The display 60 may be any display suitable for projecting holographic images. In an exemplary embodiment the display 60 includes a spatial light modulator (SLM) that is irradiated with a light source, such as by way of non-limiting examples, RGB laser light or SLED light sources. When irradiated, each of the SLM pixels will produce a wavefront having a phase that corresponds to the phase of the position of the hologram encoded at that pixel.

In an exemplary embodiment, the compute engine 56 is further adapted to encode a lens function into the holographic image 58 based on information received from the passenger monitoring system 52. The passenger monitoring system 52 gathers information on the exact location of the eyes of the passenger 50, as indicated by line 53, and determines an appropriate distance 64 at which the holographic image 58 should be perceived by the passenger 50. The multiple wavefronts exiting the SLM of the display 60 constructive and destructively interfere with one another revealing a image pattern of the holographic image 58 at the appropriate distance 64 that is tunable by also encoding a lens function into the encoded holographic image. Thus, two pieces of information are encoded into the holographic image 58, the image information and the appropriate distance 64 at which the passenger 50 should perceive the holographic image 58 (the distance where the wavefronts come together to form the holographic image 58). Tunability of the appropriate distance 64 allows the system 11 to display the holographic image with variable virtual image distance. Holographic images with variable virtual image distance allows the system 11 to project a floating holographic image 58 to the passenger 50 with the capability of making the floating holographic image 58 appear closer or further away from the passenger 50.

The light exiting the display 60 travels along a path in a straight line, as indicated by arrow 66 until it encounters a display screen 68. In an exemplary embodiment, the display screen 68 is one of a known type of display screen used within the interior of a vehicle 10 and generally connected to an infotainment system within the vehicle 10 to provide video entertainment for a passenger 50 within the vehicle 10. The display screen 68 is positioned for viewing by the passenger 50, and is generally positioned above or adjacent seating that is across from the passenger 50. As shown in FIG. 2, the passenger 50 is seated in a first seat 70A within a vehicle compartment of an autonomous vehicle 10 and the display screen 68 is positioned above a second seat 70B across from the first seat 70A. The display screen 68 may be mounted to a structural component of a seat within the vehicle compartment, or a structural component of the vehicle 10 itself, such as mounted to a roof of the vehicle 10 and hanging down for viewing by the passenger 50. As with known technology, the display screen 68 may be able to be retracted or folded away when not in use.

The display screen 68 is adapted to operate in a first mode, wherein the display screen 68 displays images and video for viewing by the passenger 50. The display screen 68 is further adapted to operate in a second mode, wherein the display screen 68 functions as a beam steering device. The display screen is adapted to be selectively switched between operating in the first and second modes. When operating in the second mode, the display screen 68 becomes reflective and the holographic image that is projected by the display 60, as indicated by line 66, hits the display screen 68 and is re-directed (reflected) to the eyes of the passenger 50, as indicated by line 72. The passenger's 50 corneal lens Fourier transforms the holograms creating an image on the passenger's 50 retina. The holographic image 58 is perceived in front of the passenger 50 at the appropriate distance 64 from the passenger 50, as specified by the lens function encoded into the holographic image 58.

In an exemplary embodiment, the display screen 68 includes a selectively reversible electromagnetic coating 74, wherein, when the display screen 68 is operating in the first mode, the reversible electromagnetic coating 74 is substantially transparent, and when the display screen 68 is operating in a second mode, the reversible electromagnetic coating 74 is reflective. In an exemplary embodiment, the reversible electromagnetic coating 74 is an electrochemical optical-modulation device with reversible transformation wherein the reversible electromagnetic coating 74 can act as a transparent glass, in the first mode, wherein the display screen 68 can be used as a normal display screen 68, and the reversible electromagnetic coating 74 can act as a reflective mirror, in the second mode, wherein the holographic image projected by the display 60 is reflected to the passenger 50, as indicated by arrow 72.

In an exemplary embodiment, the reversible electromagnetic coating 74 includes an electrolyte solution filled between two transparent electrodes within metal ions. Electric potential applied between the two electrodes controls the amount of metal deposited on the electrodes and, therefore, controls the reflectance/transmittivity of the reversible electromagnetic coating 74. Negative electric potential on a first electrode relative to a second electrode causes ion particles to be deposited on the first electrode and dissolved from the second electrode, which makes the reversible electromagnetic coating 74 reflective. The reflectivity may be up to 100%. Reversing the polarity of the electric potential causes the metal ions to be deposited on the second electrode and dissolved from the first electrode, and thus, the reflectivity of the reversible electromagnetic coating 74 is reduced, possible to zero, and the reversible electromagnetic coating 74 becomes substantially transparent. The system controller 34A, in communication with the display screen 68 via the compute engine 56, by controlling the applied voltage to the reversible electromechanical coating 74 can selectively switch the display screen 68 between the first and second modes of operation.

In an exemplary embodiment, the PGU 62 includes an adjustable diffraction grating 76 encoded into the holographic image 58, wherein an angle of the projected holographic image 58 is adjusted by the diffraction grating 76 encoded therein. The adjustable diffraction grating 76 is calculated by the compute engine 56 based on feedback from the passenger monitoring system 52 and is encoded into the holographic image 58 by the compute engine 56 to selectively adjust the angle of the projected holographic image from the display 60. The passenger monitoring system 52 identifies the location and orientation of the head and eyes 78R, 78L of the passenger 50. The system controller 34A and the compute engine 56 calculate, based on data from the passenger monitoring system 52 and the location and orientation of the display screen 68, an incidence angle at which the projected holographic image must hit the display screen 68 in order for the projected holographic image to be reflected, by the display screen 68, to the eyes 78R, 78L of the passenger 50. This information is used by the system controller 34A and the compute engine 56 to selectively calculate the diffraction grating 76, thus adjusting the angle of the projected holographic image to ensure the holographic image is properly reflected, by the display screen 68, to the eyes 78R, 78L of the passenger 50.

Figure 3:
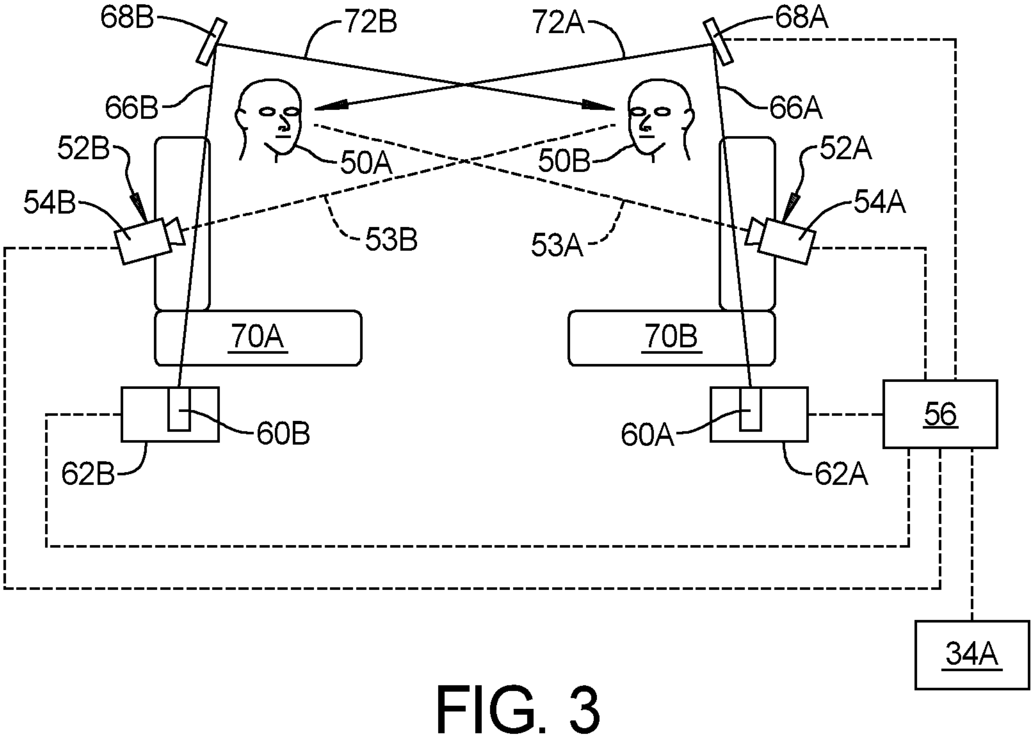
FIG. 3 is a schematic view of two seats within a vehicle incorporating a system according to an exemplary embodiment including two passenger monitoring systems and two display screens.

Referring to FIG. 3, in an exemplary embodiment, the system 11 is provided for multiple passengers 50A, 50B within a vehicle 10. As shown, the vehicle compartment includes a first seat 70A wherein a first passenger 50A is seated, a second seat 70B, wherein a second passenger 50B is seated. A camera 54A of a first passenger monitoring system 52A monitors the location of the eyes of the first passenger 50A, as indicated by arrow 53A. A compute engine 56, a first PGU hologram generator 62A, and a first display 68A direct a first holographic image to the eyes of the first passenger 50A, as indicated by arrows 66A, 72A. A second passenger monitoring system 54B monitors the location of the eyes of the second passenger 50B, as indicated by arrow 53B. The compute engine 56, a second PGU hologram generator 62B, and a second display 68B direct a second holographic image to the eyes of the second passenger 50B, as indicated by arrows 66B, 72B.

As shown in FIG. 3, a single compute engine 56 supports the first and second passenger monitoring system 54A, 54B, the first and second PGU hologram generators 62A, 62B, and the first and second displays 68A, 68B. It should be understood that multiple compute engines could be utilized without departing from the scope of the present disclosure.

Referring again to FIG. 2, in an exemplary embodiment, the holographic image 58 comprises a single two-dimensional holographic image. The single two-dimensional holographic image is a large image, such that the display 68 is adapted to re-direct the single two-dimensional holographic image directly to both a right eye 78R of the passenger 50 and a left eye 78L of the passenger 50 simultaneously, wherein the passenger 50 perceives the two-dimensional holographic image floating within the vehicle 10 in front of the passenger 50, at the appropriate distance 64.

Figure 4:
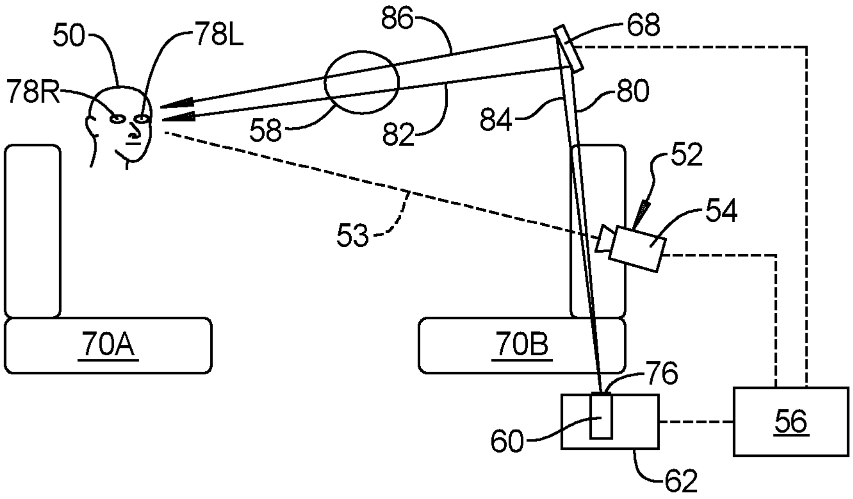
FIG. 4 is a schematic view of a system according to an exemplary embodiment wherein a diffraction grating and display screen are adapted to switch back and forth between re-directing an image to the right and left eyes of a passenger.

Referring to FIG. 4, in another exemplary embodiment, the holographic image 58 comprises a single two-dimensional holographic image, and the adjustable diffraction grating 76 is adapted to alternately adjust the angle of the projected holographic image. The system 11 switches back and forth between projecting the single two-dimensional holographic image from the display 60, angularly adjusted by the diffraction grating 76, and to the display screen 68, as indicated by arrow 80, wherein the display screen 68 re-directs the single two-dimensional holographic image 58 directly to only a right eye 78R of the passenger 50, as indicated by arrow 82, and then, projecting the single two-dimensional holographic image from the display 60, angularly adjusted by the diffraction grating 76, and to the display screen 68, as indicated by arrow 84, wherein the display screen 68 redirects the single two-dimensional holographic image 58 directly to only a left eye 78L of the passenger 50, as indicated by arrow 86. The system 11 switches back and forth between the right eye 78R and the left eye 78L at a frequency greater than 30 Hz. This is known as sequential time-multiplexing. Sequential time-multiplexing requires the compute engine to be capable of calculating the diffraction grating and encoding the diffraction grating within the holographic image, thereby adjusting the angle of the holographic image projected from the display 60, back and forth between the right eye 78R and the left eye 78L, fast enough to eliminate any perceptible image flicker by the viewing passenger 50.

In an exemplary embodiment, the compute engine calculates and encodes the diffraction grating 76 alternately to sequentially adjust the angle of the projected holographic image 58 so the display screen 68 re-directs the holographic image to the right eye 78R, as indicated by arrows 80, 82 for less than 33 milliseconds. After 33 milliseconds, the compute engine re-calculates and encodes a diffraction grating 76 that adjusts the angle of the projected holographic image 58 so the display screen 68 re-directs the holographic image to the left eye 78L, as indicated by arrows 84, 86. The holographic image 58 is re-directed to the left eye 78L for less than 33 milliseconds. This process is repeated, by alternating between re-directing the holographic image 58 to the right eye 78R for less than 33 milliseconds, and re-directing the holographic image 58 to the left eye 78L for less than 33 milliseconds.

If the frequency of switching between re-directing the holographic image 58 to the right eye 78R and the left eye 78L is greater than 30 Hz, flicker will not be perceptible by the passenger 50, and the holographic image 58 perceived by the right eye 78R and the left eye 78L of the passenger 50 will be fused into one image, as perceived by the passenger 50. A frequency of 30 Hz translates to switching between the right eye 78R and the left eye 78L every 33 milliseconds.

Figure 5:
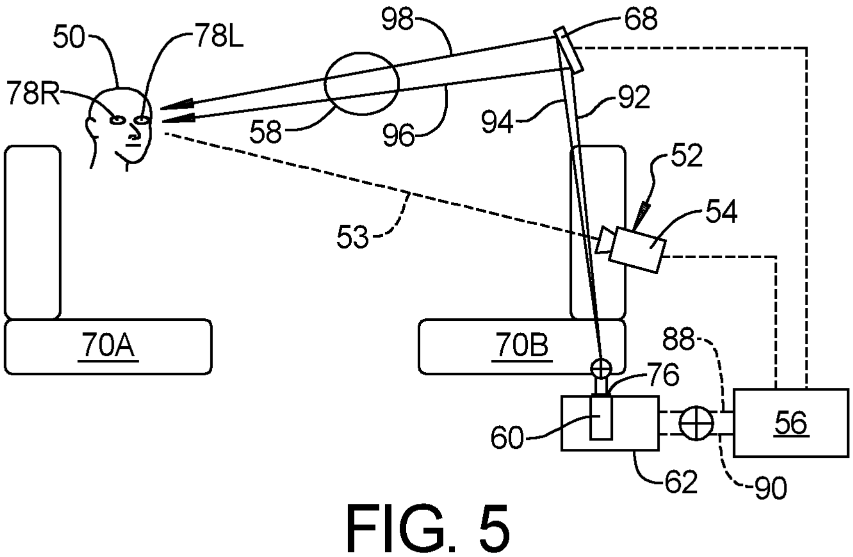
FIG. 5 is a schematic view of a system according to an exemplary embodiment wherein a compute engine is adapted to encode a right eye image and a left eye image to a display.

Referring to FIG. 5, in another exemplary embodiment, the holographic image 58 includes a right-eye image and a left-eye image. The compute engine 56 is adapted to calculate the right-eye image and the left-eye image and to alternately encode the right-eye image to the display 60 of the PGU 62, as shown by line 88, and to encode the left-eye image to the display 60 of the PGU 62, as shown by line 90, switching back and forth between encoding the right-eye image and encoding the left-eye image at a frequency greater than 30 Hz.

The display 60 is adapted to project, alternately, at a frequency greater than 60 Hz and in sync with the compute engine 56, the right-eye image to the display screen 68, as indicated by arrow 92, and the left-eye image to the display screen 68, as indicated by arrow 94. The diffraction grating 76 is adapted to, alternately, at a frequency greater than 30 Hz and in sync with the compute engine 56 and the display 60, adjust the angle of the projected right-eye image such that the display screen 68, when in the second mode, re-directs the right-eye image directly to the right eye 78R of the passenger 50 and, adjust the angle of the projected left-eye image such that the display screen 68, when in the second mode, re-directs the left-eye image directly to the left eye 78L of the passenger 50.

The diffraction grating 76, the display 60 and the compute engine 56 are all in sync with one another, wherein, when the compute engine 56 is encoding the right eye image to the display 60, as indicated by line 88, the display 60 is projecting the right eye image, angularly adjusted by the diffraction grating 76, to the display screen 68, as indicated by arrow 92, and the display screen 68 re-directs the right eye image to the right eye 78R of the passenger 50, as indicated by line 96. When the compute engine 56 is encoding the left eye image to the display 60, as indicated by line 90, the display 60 is projecting the left eye image, angularly adjusted by the diffraction grating 76 to the display screen 68, as indicated by arrow 94, and the display screen 68 re-directs the left eye image to the left eye 78L of the passenger 50, as indicated by line 98.

The right-eye image and the left-eye image are slightly different perspectives of a single image such that when the right eye 78R of the passenger 50 receives the right-eye image and the left eye 78L of the passenger 50 receives the left-eye image, the passenger 50 perceives a three-dimensional holographic image 58 floating within the vehicle 10 in front of the passenger 50.

This provides an autostereoscopic three-dimensional display by adding binocular perception of three-dimensional depth without the use of special headgear, glasses, something that affects the viewer's vision, or anything for the viewer's eyes. Because headgear is not required, autostereoscopic displays are also referred to as "glasses-free 3D" or "glassesless 3D".

Figure 6:
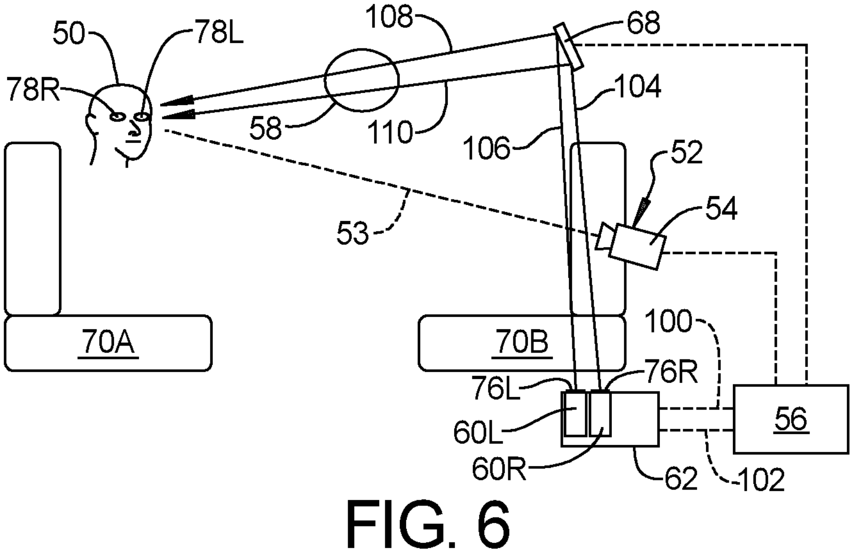
FIG. 6 is a schematic view of a system according to an exemplary embodiment including a right eye display and a left eye display.

Referring to FIG. 6, in another exemplary embodiment, the holographic image 58 includes a right-eye image and a left-eye image, the PGU 62 includes a right-eye display 60R and a left-eye display 60L. The compute engine 56 is adapted to calculate the right-eye image and the left-eye image and to simultaneously encode the right-eye image to the right eye display 60R, as shown by line 100, and to encode the left-eye image to the left eye display 60L, as shown by line 102.

The right-eye image a first adjustable diffraction grating 76R encoded therein and the left-eye image includes a second adjustable diffraction grating 76L encoded therein. The right-eye display 60R and the left-eye display 60L are adapted to project, simultaneously, the right-eye image, angularly adjusted by the first diffraction grating 76R to the display screen 68, as indicated by arrow 104, and the left-eye image, angularly adjusted by the second diffraction grating 76L to the display screen 68, as indicated by arrow 106.

The first diffraction grating 76R is calculated by the compute engine 56 to selectively adjust the angle of the projected right-eye image from the right-eye display 60R based on feedback from the passenger monitoring system 52, such that the display screen 68, when in the second mode, re-directs the right-eye image directly to the right eye 78R of the passenger 50, as indicated by arrow 108, and, simultaneously, the second diffraction grating 76L is calculated by the compute engine 56 to selectively adjust the angle of the projected left-eye image from the left-eye display 60L based on feedback from the passenger monitoring system 52, such that the display screen 68, when in the second mode, re-directs the left-eye image directly to the left eye 78L of the passenger 50, as indicated by arrow 110.

The right-eye image and the left-eye image are slightly different perspectives of a single image such that when the right eye 78R of the passenger 50 receives the right-eye image and the left eye 78L of the passenger 50 receives the left-eye image, the passenger's right eye 78R and left eye 78L will fuse the right eye image and the left eye image into the perceived three-dimensional holographic image 58 floating within the vehicle 10 in front of the passenger 50. In another exemplary embodiment, the right eye image and the left eye image are the same image, and thus, the passenger perceives a two-dimensional holographic image 58 floating within the vehicle 10 in front of the passenger 50.

Figure 7:
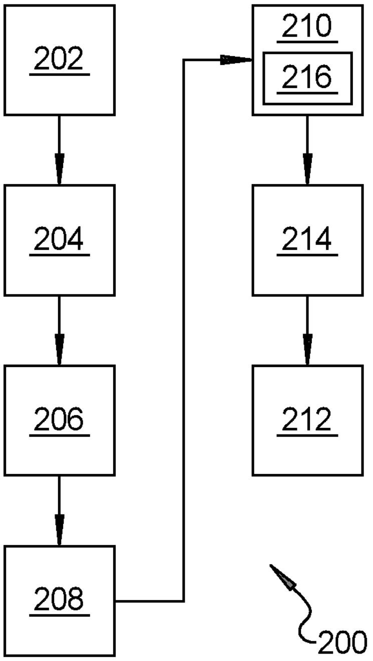
FIG. 7 is a schematic flow chart illustrating a method according to an exemplary embodiment of the present disclosure.

Referring to FIG. 7, a method 200 of generating a floating image for a passenger 50 within a vehicle 10, includes, starting at block 202, monitoring, with a passenger monitoring system 52, the position of the passenger's 50 head and eyes, moving to block 204, calculating, with a compute engine 56 in communication with the passenger monitoring system 52, a holographic image 58 and, moving to block 206, encoding, with the compute engine 56, a lens function into the holographic image 58 based on information received from the passenger monitoring system 52, moving to block 208, encoding the holographic image 58 to a display 60 of a picture generating unit (PGU) hologram generator 62.

Moving to block 210, the method 200 further includes projecting, with the display 60, the holographic image 58 to a display screen 68 that is positioned for viewing by the passenger 50 and adapted to selectively switch between a first mode, wherein the display screen 68 is adapted to display images for viewing by the passenger 50, and a second mode, wherein the display screen 68 is adapted to function as a beam steering device; and Moving to block 212, the method 200 further includes, when the display screen 68 is operating in the second mode, re-directing, with the display screen 68, the projected holographic image 58 to the eyes 78R, 78L of the passenger 50, based on the information received from the passenger monitoring system 52.

In an exemplary embodiment, the display screen 68 includes a selectively reversible electromagnetic coating 74, wherein, when the display screen 68 is operating in the first mode, the reversible electromagnetic coating 74 is substantially transparent, and when the display screen 68 is operating in a second mode, the reversible electromagnetic coating 74 is reflective, the method 200 further including, moving to block 214, actuating the selectively reversible electromagnetic coating 74 to cause the display screen 68 to operate in the second mode.

In another exemplary embodiment, the projecting, with the display 60, the holographic image 58 to the display screen 68 that is positioned for viewing by the passenger at block 210 further includes selectively adjusting, with an adjustable diffraction grating 76 encoded within the holographic image 58, the angle of the projected holographic image 58 from the display 60 based on feedback from the passenger monitoring system 52.

In another exemplary embodiment, the calculating, with the compute engine 56, the holographic image 58 at block 204 further includes, calculating, with the compute engine 56, a single two-dimensional holographic image, and the re-directing, with the display screen 68, the projected holographic image 58 to the eyes 78R, 78L of the passenger 50 at block 212 further includes, re-directing, with the display screen 68, the single two-dimensional holographic image 58 directly to both a right eye 78R of the passenger 50 and a left eye 78L of the passenger 50 simultaneously, wherein the passenger 50 perceives the two-dimensional holographic image 58 floating within the vehicle 10 in front of the passenger 50.

In another exemplary embodiment, the calculating, with the compute engine 56, the holographic image 58 at block 204 further includes, calculating, with the compute engine 56, a single two-dimensional holographic image, the selectively adjusting, with an adjustable diffraction grating 76 encoded within the holographic image 58, the angle of the projected holographic image 58 from the display 60 based on feedback from the passenger monitoring system 52 at block 216 further includes alternately adjusting, with the adjustable diffraction grating 76 encoded within the holographic image 58, the angle of the projected holographic image 58 from the display 60 based on feedback from the passenger monitoring system 52, and the re-directing, with the display screen 68, the projected holographic image 58 to the eyes 78R, 78L of the passenger 50 at block 212 further includes, alternately re-directing, with the beam steering device 68, the single two-dimensional holographic image directly to only a right eye 78R of the passenger 50 and then only to a left eye 78L of the passenger 50, switching back and forth between the right eye 78R and the left eye 78L at a frequency greater than 30 Hz, wherein the passenger 50 perceives the two-dimensional holographic image 58 floating within the vehicle 10 in front of the passenger 50.

In another exemplary embodiment, the holographic image 58 includes a right-eye image and a left-eye image, and the calculating, with the compute engine 56, the holographic image 58 at block 204 further includes, calculating, with the compute engine 56, the right-eye image and the left-eye image. The encoding the holographic image 58 to the display 60 of the picture generating unit (PGU) hologram generator 62 at block 208 further includes alternately encoding, with the compute engine 56, the right-eye image to the display 60 and encoding, with the compute engine 56, the left-eye image to the display 60, and switching back and forth between encoding the right-eye image and encoding the left-eye image at a frequency greater than 30 Hz. The projecting, with the display 60, the holographic image 58 to the display screen 68 at block 210 further includes projecting, alternately, at a frequency greater than 30 Hz and in sync with the compute engine 56, the right-eye image and the left-eye image to the display screen 68.

The re-directing, with the display screen 68, the projected holographic image 58 to the eyes 78R, 78L of the passenger 50 at block 212 further includes alternately, at a frequency greater than 30 Hz and in sync with the compute engine 56 and the display 60, adjusting, with the diffraction grating 76 encoded within the holographic image 58, the angle of the projected right-eye image and re-directing, with the display screen 68, the right-eye image directly to the right eye 78R of the passenger 50 and adjusting, with the diffraction grating 76 encoded within the holographic image 58, the angle of the projected left-eye image and re-directing, with the display screen 68, the left-eye image directly to the left eye 78L of the passenger 50, wherein the right-eye image and the left-eye image are slightly different perspectives of a single image such that when the right eye 78R of the passenger 50 receives the right-eye image and the left eye 78L of the passenger 50 receives the left-eye image, the passenger 50 perceives a three-dimensional image floating within the vehicle 10 in front of the passenger 50.

In another exemplary embodiment, the holographic image 58 includes a right-eye image and a left-eye image, the display 60 includes a right-eye display 60R and a left-eye display 60L, and the right-eye image includes a first adjustable diffraction grating 76R encoded therein and the left-eye image includes a second adjustable diffraction grating 76L encoded therein. The calculating, with the compute engine 56, the holographic image 58 at block 204 further includes calculating, with the compute engine 56, the right-eye image and the left-eye image. The encoding the holographic image 58 to the display 60 of the picture generating unit (PGU) hologram generator 62 at block 208 further includes simultaneously encoding, with compute engine 56, the right-eye image onto the right-eye display 60R and encoding, with the compute engine 56, the left-eye image onto the left-eye display 60L. The projecting, with the display 60, the holographic image 58 to the display screen 68 at block 210 further includes simultaneously projecting, with the right-eye display 60R and the left-eye display 60L, the right-eye image, angularly adjusted by the first diffraction grating 76R, to the display screen 68 and the left-eye image, angularly adjusted by the second diffraction grating 76L, to the display screen 68.

The re-directing, with the display screen 68, the projected holographic image 58 to the eyes 78R, 78L of the passenger 50 at block 212 further includes simultaneously adjusting the angle of the projected right-eye image from the right-eye display 60R with the first diffraction grating 76R based on feedback from the passenger monitoring system 52, adjusting the angle of the projected left-eye image from the left-eye display 60L with the second diffraction grating 76L based on feedback from the passenger monitoring system 52, re-directing, with the display screen 68, the right-eye image directly to the right eye 78R of the passenger 50, and, re-directing, with the display screen 68, the left-eye image directly to the left eye 78L of the passenger 50, wherein the right-eye image and the left-eye image are slightly different perspectives of a single image such that when the right eye 78R of the passenger 50 receives the right-eye image and the left eye 78L of the passenger 50 receives the left-eye image, the passenger 50 perceives a three-dimensional image floating within the vehicle 10 in front of the passenger 50.

A system 11 and method 200 of the present disclosure offers several advantages. These include providing either a two-dimensional or three-dimensional holographic image floating at a position within the vehicle 10 in front of the passenger 50. Further, the system of the present disclosure allows an existing display screen within a vehicle to be retro-fitted with an electrochemical coating allowing the display screen to be used in either of the first or second modes.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for generating a floating image for a passenger within a vehicle, comprising:

a passenger monitoring system adapted to monitor the position of the passenger's head and eyes;

a compute engine in communication with the passenger monitoring system and adapted to calculate a holographic image and encode the holographic image to a display of a picture generating unit (PGU) hologram generator; and a display screen positioned for viewing by the passenger, the display screen adapted to selectively switch between a first mode, wherein the display screen is adapted to display images for viewing by the passenger, and a second mode, wherein the display screen is adapted to function as a beam steering device;

wherein, when the display screen is operating in the second mode, the display is adapted to project the holographic image to the display screen and the display screen is adapted to alternately re-direct the projected holographic image, based on the information received from the passenger monitoring system, directly to only a right eye of the passenger and then only to a left eye of the passenger, switching back and forth between the right eye and the left eye at a frequency greater than 30 Hz, wherein the passenger perceives the holographic image floating within the vehicle in front of the passenger;

wherein the holographic image comprises a single two-dimensional holographic image, and the diffraction grating is adapted to alternately adjust the angle of the projected holographic image, wherein the display screen, when operating in the second mode, is adapted to alternately re-direct the single two-dimensional holographic image directly to only a right eye of the passenger and then only to a left eye of the passenger, switching back and forth between the right eye and the left eye at a frequency greater than 30 Hz, wherein the passenger perceives the two-dimensional holographic image floating within the vehicle in front of the passenger.

2. The system of claim 1, wherein the compute engine is further adapted to encode a lens function into the holographic image based on information received from the passenger monitoring system.

3. The system of claim 2, wherein the display screen includes a selectively reversible electromagnetic coating, wherein, when the display screen is operating in the first mode, the reversible electromagnetic coating is substantially transparent, and when the display screen is operating in a second mode, the reversible electromagnetic coating is reflective.

4. The system of claim 2, wherein the compute engine is further adapted to calculate and encode an adjustable diffraction grating into the holographic image, wherein the diffraction grating is adapted to selectively adjust the angle of the projected holographic image from the display based on feedback from the passenger monitoring system.

5. The system of claim 1, wherein the display screen is mounted within the vehicle adjacent to or above passenger seating that is opposite the passenger.

6. A method of generating a floating image for a passenger within a vehicle, comprising:

- monitoring, with a passenger monitoring system, the position of the passenger's head and eyes;
- calculating, with a compute engine in communication with the passenger monitoring system, a single two-dimensional holographic image;
- encoding, with the compute engine, a lens function into the holographic image based on information received from the passenger monitoring system;
- encoding the holographic image to a display of a picture generating unit (PGU) hologram generator;
- projecting, with the display, the holographic image to a display screen that is positioned for viewing by the passenger and adapted to selectively switch between a first mode, wherein the display screen is adapted to display images for viewing by the passenger, and a second mode, wherein the display screen is adapted to function as a beam steering device;
- encoding, with the compute engine, an adjustable diffraction grating into the holographic image and alternately adjusting, with the adjustable diffraction grating, the angle of the projected holographic image from the display based on feedback from the passenger monitoring system; and
- when the display screen is operating in the second mode, alternately re-directing, with the display screen, the projected the single two-dimensional holographic image, based on the information received from the passenger monitoring system directly to only a right eye of the passenger and then only to a left eye of the passenger, switching back and forth between the right eye and the left eye at a frequency greater than 30 Hz, wherein the passenger perceives the holographic image floating within the vehicle in front of the passenger.

7. The method of claim 6, wherein the display screen includes a selectively reversible electromagnetic coating, wherein, when the display screen is operating in the first mode, the reversible electromagnetic coating is substantially transparent, and when the display screen is operating in a second mode, the reversible electromagnetic coating is reflective, the method further including actuating the selectively reversible electromagnetic coating to cause the display screen to operate in the second mode.

8. The method of claim 6, wherein the calculating, with the compute engine, the holographic image further includes, calculating, with the compute engine, a single two-dimensional holographic image, and the re-directing, with the display screen, the projected holographic image to the eyes of the passenger further includes, re-directing, with the display screen, the single two-dimensional holographic image directly to both a right eye of the passenger and a left eye of the passenger simultaneously, wherein the passenger perceives the two-dimensional holographic image floating within the vehicle in front of the passenger.

9. A vehicle having a system for generating a floating image for a passenger within the vehicle, the system comprising:

- a passenger monitoring system adapted to monitor the position of the passenger's head and eyes;
- a compute engine in communication with the passenger monitoring system and adapted to:
  - calculate a single two-dimensional holographic image;
  - encode a lens function into the holographic image based on information received from the passenger monitoring system;
  - calculate a diffraction grating adapted to selectively adjust the angle of the projected holographic image based on feedback from the passenger monitoring system;
  - encode the diffraction grating into the holographic image; and
  - encode the holographic image to a display of a picture generating unit (PGU) hologram generator; and
- a display screen positioned for viewing by the passenger, the display screen including a selectively reversible electromagnetic coating adapted to selectively switch between a first mode, wherein the reversible electromagnetic coating is substantially transparent, and a second mode, wherein the reversible electromagnetic coating is reflective and the display screen is adapted to function as a beam steering device; and
- wherein, the display is adapted to project the single two-dimensional holographic image, through the adjustable diffraction grating, to the display screen, the diffraction grating adapted to alternately adjust the angle of the projected holographic image, and the display screen, when operating in the second mode, is adapted to alternately re-direct the projected single two-dimensional holographic image, based on the information received from the passenger monitoring system, directly to only a right eye of the passenger and then only to a left eye of the passenger, switching back and forth between the right eye and the left eye at a frequency greater than 30 Hz, wherein the passenger perceives the holographic image floating within the vehicle in front of the passenger.

* * * * *